UNITED STATES PATENT OFFICE.

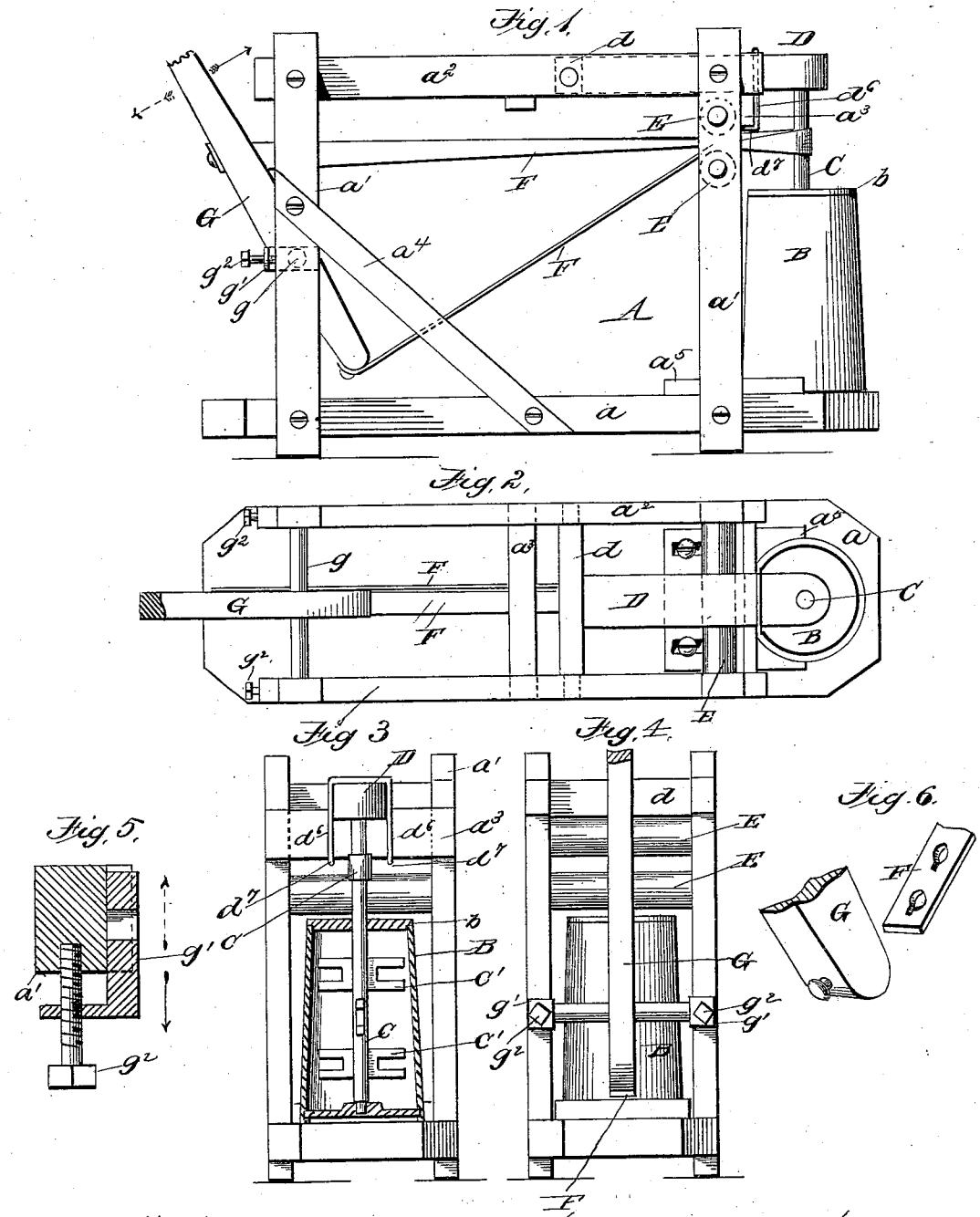

ELY B. BEARD AND JAMES R. BRUCE, OF GADSDEN, ALABAMA.

CHURN.

SPECIFICATION forming part of Letters Patent No. 306,999, dated October 21, 1884.

Application filed March 24, 1884. (No model.)

*To all whom it may concern:*

Be it known that we, ELY B. BEARD and JAMES R. BRUCE, citizens of the United States, residing at Gadsden, in the county of Etowah and State of Alabama, have invented certain new and useful Improvements in Churns; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to churns, and has for its object the provision of means whereby the dasher can be conveniently and rapidly operated and certain parts readily adjusted when worn by use; and the invention consists in the construction, combination, and arrangement of parts, substantially as hereinafter described and claimed.

In the drawings, Figure 1 is a side elevation of a churn provided with our improvements. Fig. 2 is a top plan view thereof. Fig. 3 is an elevation of the front end, the churn being shown in section to clearly show details of construction of the dasher. Fig. 4 is an elevation of the rear end of the churn. Figs. 5 and 6 represent tension devices for the operating-belt.

Similar letters of reference in the several drawings denote like parts.

In the drawings, A represents the frame, consisting of the bottom plate, $a$, uprights $a'$, longitudinal timbers $a^2$, and transverse timbers $a^3$. Struts or braces $a^4$ serve to give strength and rigidity to the frame. The bottom plate, $a$, extends forward of the frame to support the churn B, as shown.

$a^5$ represents a stop secured to the upper surface of said bottom plate, to enable the churn to be held in proper position.

B represents the churn, consisting of a tubular upright vessel closed at its top by a removable cover, $b$, and having an aperture, $b'$, for the passage of the dasher-shaft C.

C represents the dasher-shaft, journaled or stepped in the bottom of the churn, at the center thereof, and extending thence through the cover of the churn to and journaled in a horizontal bar, D, at the top of the frame. The bar D is provided at its rear end with a cross-head, $d$, that extends from side to side of the frame, and is pivoted at each end in the upper rails, $a^2$, thereof, whereby the outer end of the horizontal bar D may be raised or lowered for the purpose of removing and replacing the dasher C of the churn. The outer end of said bar rests in a notch formed in the upper surface of the upper transverse timber, $a^3$, at the forward end of the machine, said bar being prevented from lateral movement by the notch. A clasp, $d^6$, is placed over the bar at the forward edge of the transverse timber $a^3$. The lower end, $d^7$, of the clasp projects under the transverse timber, and serves to hold the bar D down and in position for operation, as shown.

C' C' represent blades extending outwardly at right angles to the dasher-shaft C, their outer ends being bifurcated, as shown. We preferably use four blades, C'; but it is obvious that a greater or less number may be employed.

E represents guide-rollers, extending from one to the other of the forward uprights, $a'$, and journaled at each end in said uprights, as shown. The guide-rolls E are above the top of the vessel B, and serve to keep the forward portion of the belt F in proper position.

F represents a belt extending from the lower end of a vertical lever, G, to and between the guide-rolls E, thence passing around the dasher-shaft and back between the guide-rolls E to the lever G, to which it is attached, above the fulcrum thereof.

G represents a vertical lever hung or fulcrumed to a cross-bar, $g$, extending from one to the other of the rear uprights, and is pivoted in adjustable boxes $g'$, thereto attached. The boxes $g'$ are adjusted by screws $g^2$. The strap or belt is attached to the lever at each side of and equidistant from the fulcrum.

If desired, the churn may be thrown forward and held by sliding stops of the plate $a$ of the frame. When this construction is employed, the outer end of the horizontal bar D is provided with a sliding box, which is held at any desired point by suitable fastenings.

The operation of our device is as follows: The churn, separate from the frame, is provided with cream, after which it is placed in position upon the frame. The dasher is now placed within the churn, the upper end thereof having its bearing in the bar D and within the loop or bight of the belt F. The upper end of the lever G is now moved forward and backward, oscillating upon its fulcrum, and through the belt F rotating the dasher-shaft C in opposite directions alternately, as will be readily understood.

We are aware that modifications of our improvement may be made—as, for instance, the strap may be adjustably attached to the lever G and tightened when desired; and we therefore do not wish to limit ourselves to the exact construction shown and described, but claim the right to make such modifications as fairly fall within the scope of our invention, substantially as described and shown.

What we claim as our invention, and desire to secure by Letters Patent of the United States, is—

In a churn-power, a frame having a base-plate, uprights, longitudinal and transverse timbers, and guide-rolls, in combination with the pivoted bar D, resting in a notch in the timber $a^3$, clasp $d^6$ $d^7$, lever G, having an adjustable fulcrum, bolt F, dasher-shaft, and churn, substantially as herein shown and described.

In testimony whereof we affix our signatures in presence of two witnesses.

ELY B. BEARD.
JAMES R. BRUCE.

Witnesses:
W. NICHOLS,
JAS. A. WILSON.